United States Patent
Barandiaran Salaberria

(10) Patent No.: US 6,934,996 B2
(45) Date of Patent: Aug. 30, 2005

(54) SYSTEM FOR ACTUATING A GAS DAMPER

(75) Inventor: Javier Barandiaran Salaberria, San Sebastian (ES)

(73) Assignee: Gain Gas Technique S.L., Lezo (ES)

( * ) Notice: Subject to any disclaimer, the term of this patent is extended or adjusted under 35 U.S.C. 154(b) by 0 days.

(21) Appl. No.: 10/311,082

(22) PCT Filed: Apr. 15, 2002

(86) PCT No.: PCT/ES02/00182
§ 371 (c)(1),
(2), (4) Date: Jul. 8, 2003

(87) PCT Pub. No.: WO02/084140
PCT Pub. Date: Oct. 24, 2002

(65) Prior Publication Data
US 2004/0103498 A1 Jun. 3, 2004

(30) Foreign Application Priority Data

Apr. 16, 2001 (ES) .......................... 200100872
May 9, 2001 (ES) .......................... 200101058
Dec. 5, 2001 (ES) .......................... 200102714

(51) Int. Cl.⁷ ................................ E05F 3/00
(52) U.S. Cl. ........................................ 16/66
(58) Field of Search ............... 16/66, 65, 78, 16/67, 72, 49, 84; 188/280, 281, 282.5, 282.6, 282.8, 282.9, 300, 322.15, 322.16, 322.17, 322.18; 267/225, 226, 64.12, 64.13, 64.14, 64.15

(56) References Cited

U.S. PATENT DOCUMENTS

| | | | | |
|---|---|---|---|---|
| 1,164,371 A | * | 12/1915 | Lovejoy | .............. 188/282.9 |
| 1,254,024 A | * | 1/1918 | Bryan | .......................... 417/513 |
| 4,303,231 A | * | 12/1981 | Reuschenbach et al. | . 267/64.15 |
| 4,423,800 A | * | 1/1984 | Kobiske et al. | ............. 188/277 |
| 4,449,702 A | * | 5/1984 | Hasegawa | ................. 267/64.12 |
| 5,450,933 A | * | 9/1995 | Schuttler | ..................... 188/300 |
| 5,560,456 A | * | 10/1996 | Koch et al. | .................. 188/300 |
| 5,842,255 A | * | 12/1998 | Luca | .............................. 16/51 |
| 5,915,674 A | | 6/1999 | Wolf et al. | |
| 6,615,449 B1 | * | 9/2003 | Alvarez | .......................... 16/66 |
| 6,634,058 B1 | * | 10/2003 | Lin | ................................ 16/66 |

FOREIGN PATENT DOCUMENTS

| | | | | | |
|---|---|---|---|---|---|
| DE | 3442262 A | * | 8/1985 | ............. | E05F/3/00 |
| EP | 59665 A | * | 9/1982 | ........... | B62D/25/12 |
| EP | 0 969 221 | | 1/2000 | | |
| EP | 1 045 166 | | 10/2000 | | |
| ES | 294.256 | | 5/1986 | | |
| ES | 2 024 193 | | 2/1992 | | |
| JP | 10287274 A | * | 10/1998 | ........... | B62D/25/12 |
| JP | 10311361 A | * | 11/1998 | ............. | F16F/9/44 |

* cited by examiner

Primary Examiner—Chuck Y. Mah
(74) Attorney, Agent, or Firm—Jacobson & Holman PLLC

(57) ABSTRACT

A gas-filled cylinder, with two concentric cylindrical bodies or tubes that determine an intermediate gas passage chamber and are separated by a shaft cap and a valve cap that allow the passage of gas towards the interior, in which a piston moves and forms two internal chambers. The gas passes from one chamber to the other when the valve shaft is operated. This valve shaft is of considerable length and can be operated by small movements.

2 Claims, 4 Drawing Sheets

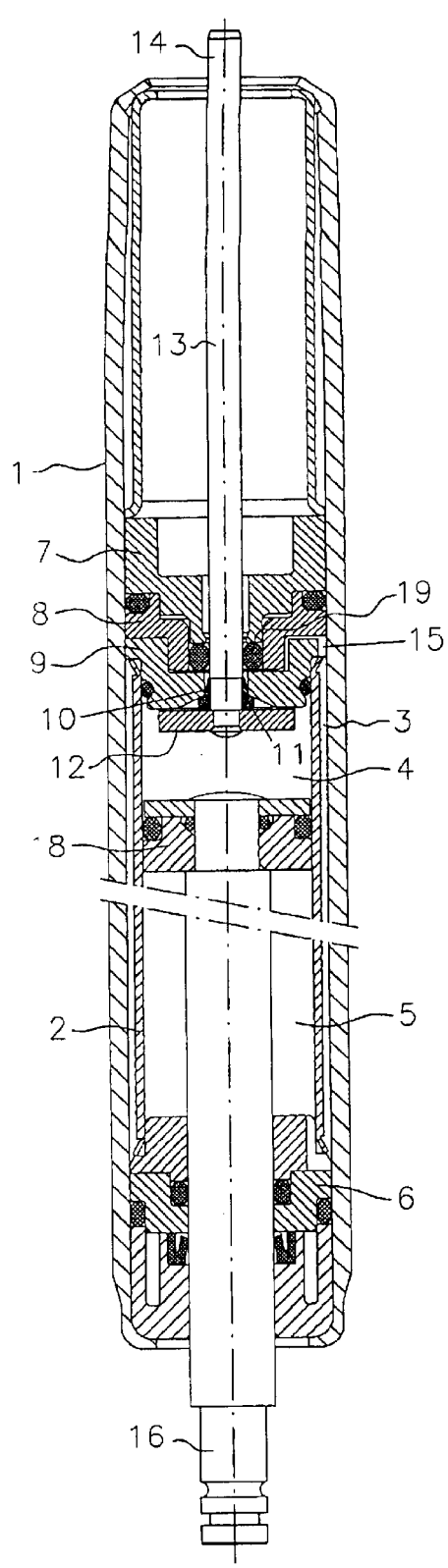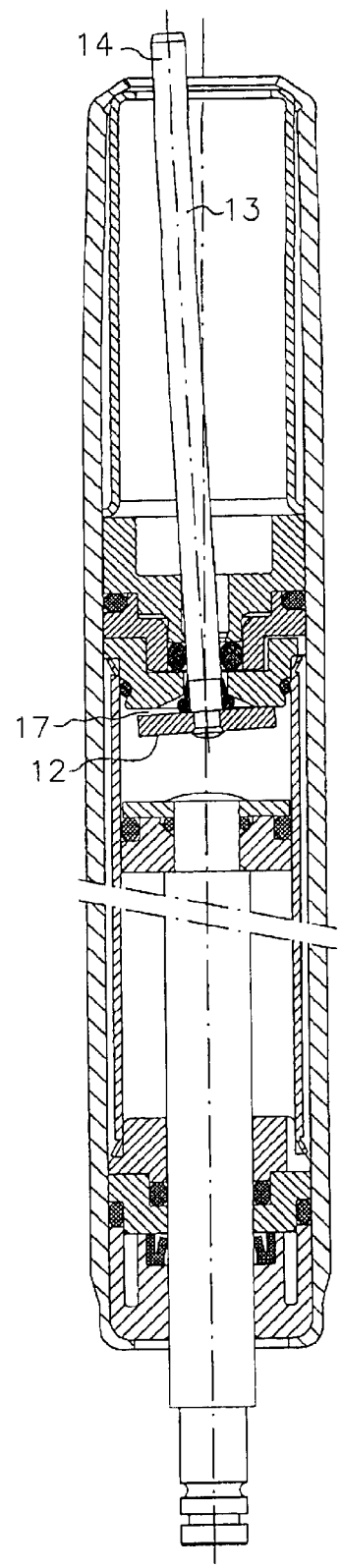
Fig:1    Fig:2

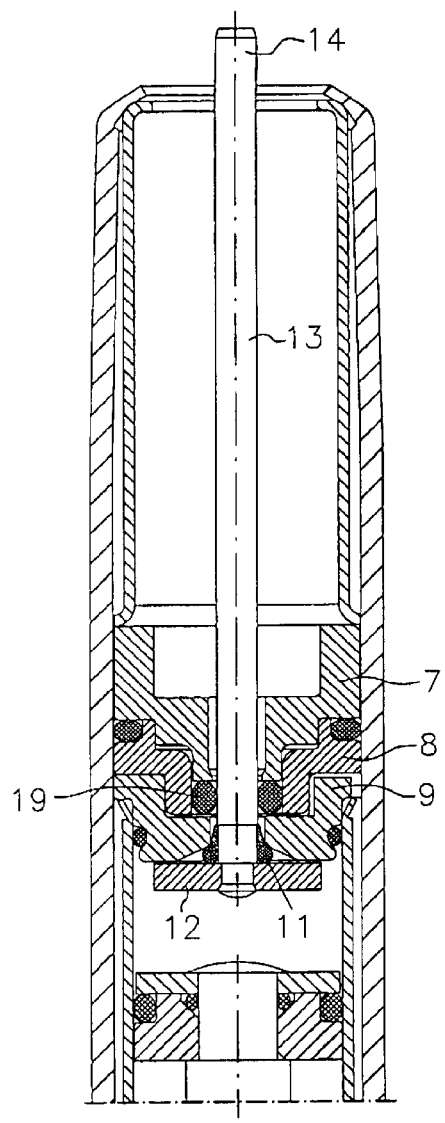
Fig:3
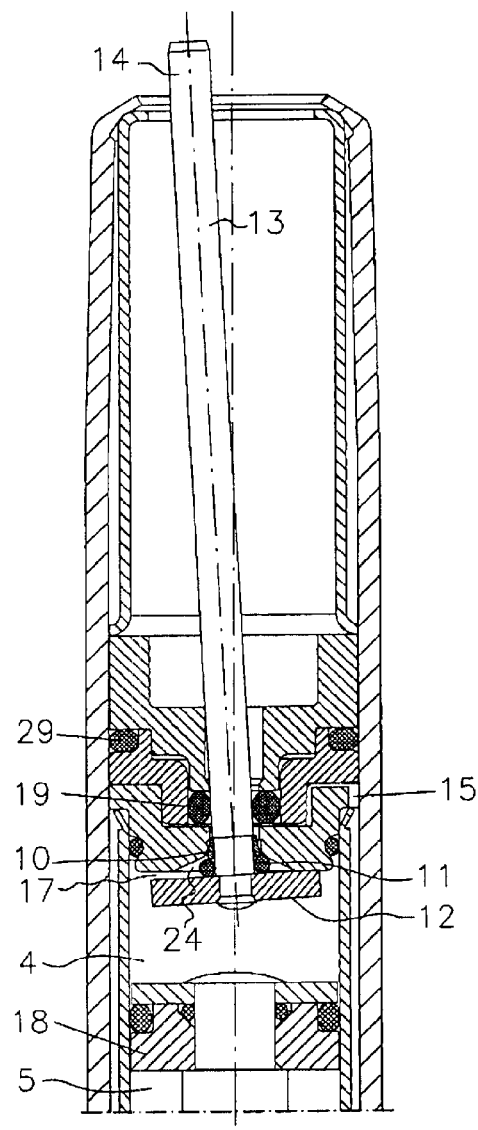
Fig:4
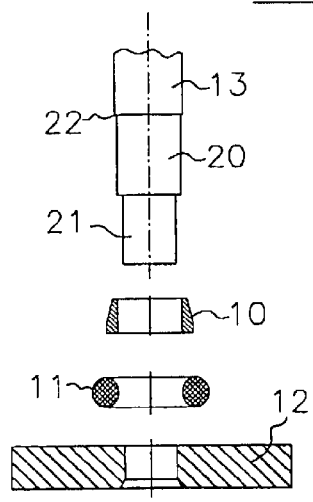
Fig:5
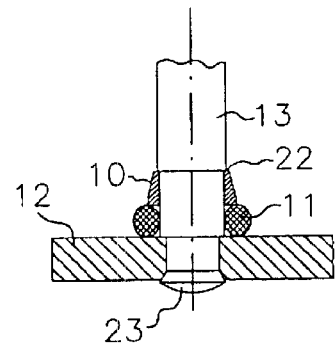
Fig:6

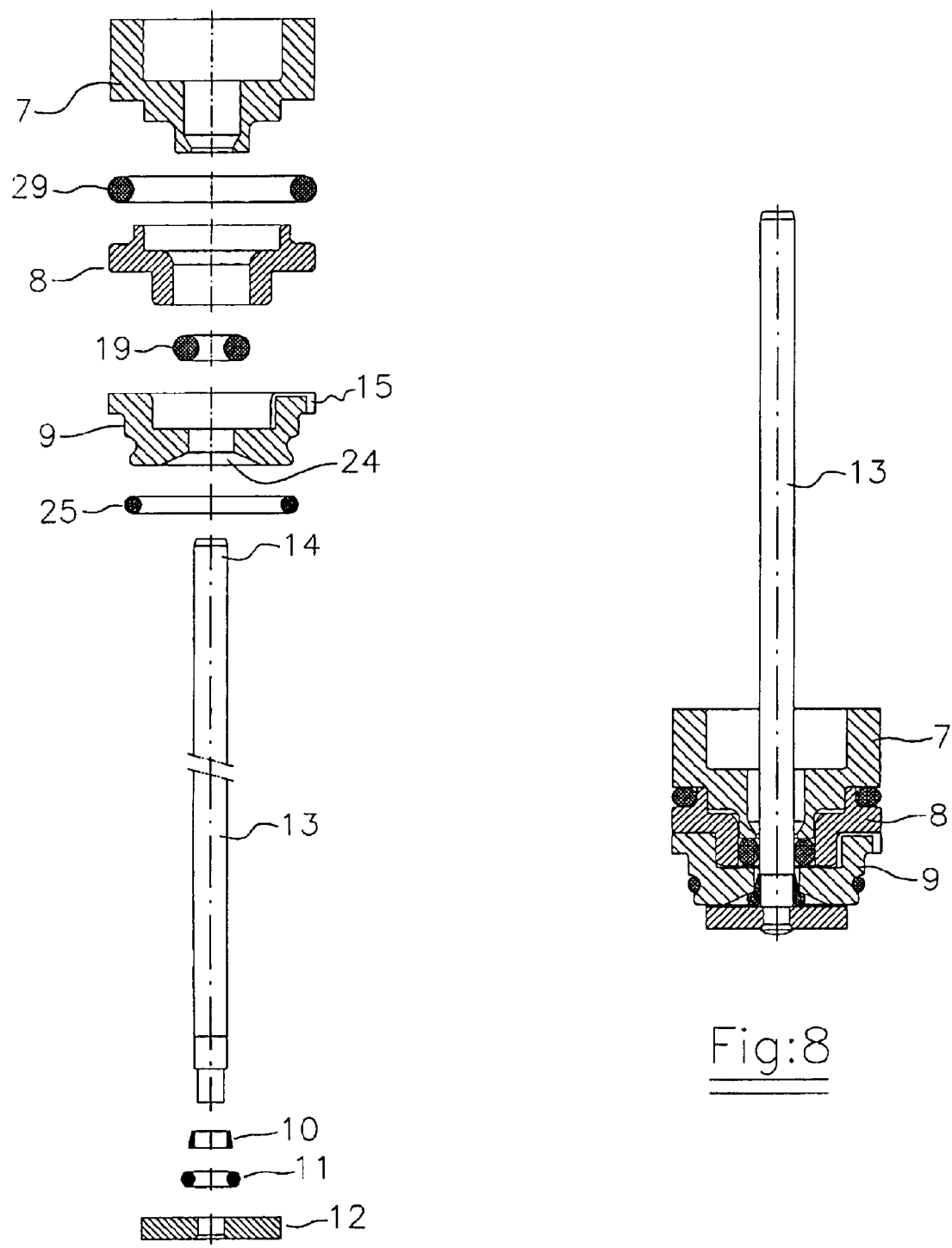
Fig:7
Fig:8

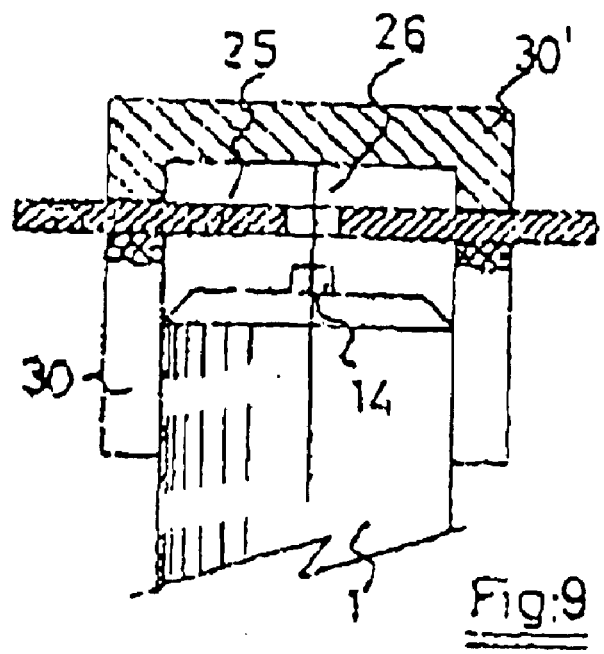
Fig: 9
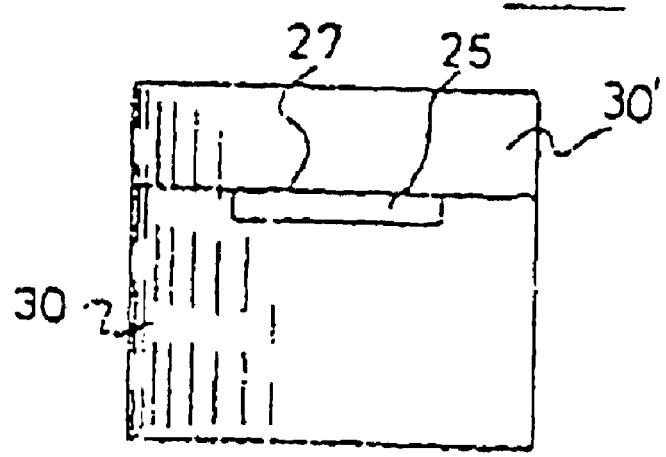
Fig: 10
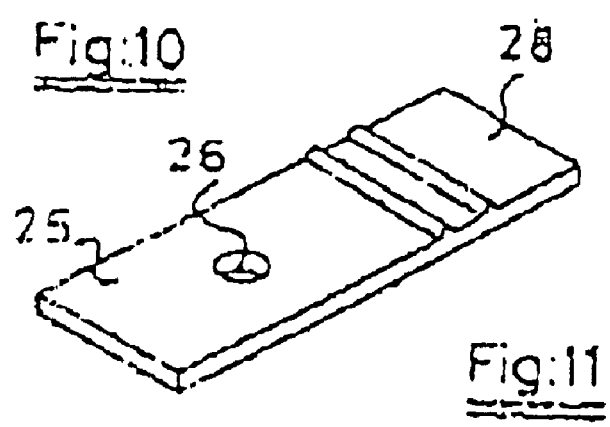
Fig: 11

SYSTEM FOR ACTUATING A GAS DAMPER

This is a nationalization of PCT/ES02/00182 filed Apr. 15, 2002 and published in Spanish.

FIELD OF THE INVENTION

This invention relates to a gas-filled cylinder, of the type which is composed of two concentric cylindrical tube bodies separated by an intermediate gas chamber and held in this position by two caps or plugs, a valve cap and a shaft cap, which are secured to the outer cylindrical tube body and which control the ends of the inner cylindrical tube body.

The valve cap and the shaft cap are provided with passageways that communicate the space in the inner cylindrical body with the intermediate gas chamber.

The valve shaft passes through the valve cap and the cylinder shaft passes through the shaft cap, and the cylinder shaft has a head by way of a piston that moves inside the inner cylindrical tube body, thus forming two internal chambers, above and below the head or piston.

The gas occupies the internal chamber space at one or the other side of the head, passing from one internal chamber to the other internal chamber through the previously mentioned passageways in the valve cap and the shaft cap, when the valve shaft is operated from the exterior.

In order to provide these passageways, the valve shaft includes a dynamic ring seal, which, when the shaft is operated from the exterior, allows the gas to pass from the upper internal chamber to the lower internal chamber through the space between the two cylindrical tube bodies.

BACKGROUND OF THE INVENTION

Types of cylinders with these characteristics are known are known through references FR-A-2,661,229 and EP-1158201-A1 in favour of the applicant.

In these references, the valve cap and the shaft cap are conceived by means of the union of components which can be coupled together, and between which the passageways for the gas to pass from one chamber to the other are formed.

In the same way, the valve shaft is elongated and protrudes outside the cylinder, and is also provided with a dynamic ring seal that closes or opens over the front of the lower part among those that make up the valve cap, so that when the shaft moves due to its being operated from the exterior, the passage of gas is opened from the upper intermediate chamber between the cylindrical bodies.

The operation of the said shaft from the exterior is usually carried out by means of a lever, which provides sufficient power movement to move the valve shaft without any problem in order to adjust the position of the cylinder shaft.

More recently, however, the technique of using push-buttons, switches, etc. to operate the valve shaft is becoming more widespread, with which the force to be applied through the user's finger must be considerably lower than is traditional, of about 1.5 to 1.7 kg., which leads to shaft traverses or strokes which are very limited, for instance of the order of 1.5 to 2 nm.

This trend has brought about a variation in the traditional arrangements of the movement of the valve shaft, because on many occasions its movements are carried out based on cables or wires operated by the previously mentioned push-buttons.

Therefore, the axial movements have become lateral or circular movements, thanks to the pivoting of the value shaft when it is operated by the exterior control.

SUMMARY OF THE INVENTION

One object of the invention is to provide a gas-filled cylinder whose valve shaft is empowered to provide the passage of the gas with its own slight movements, whether in a lateral direction or circular direction or axial linear direction, with an extraordinary increase in the sensitivity of the shaft when it is operated from the exterior.

Another object of the invention is to provide a gas-filled cylinder which is easy to manufacture and economical to produce.

Another object of the invention is to provide a gas-filled cylinder that enables its fast assembly in an outer body for the application of any method of shaft operation.

In order to put these objectives into practice, the cylinder uses a valve cap composed of three parts, upper, middle and lower, appropriately assembled together as suggested in EP-1158201-A1, so that the passage of gas from the internal chamber inside the inner tube body to the intermediate chamber between the tube bodies takes place between the middle and lower parts of the valve cap.

The valve shaft in the case of this invention passes through the centers of the three parts of the valve cap with the total absence of physical support contact with any of them, but only with a separating inner ring seal, which does not hinder or alter the free movement of the valve shaft.

The inner ring seal in question is situated above the chamber between the tube bodies.

The valve shaft is finished off at its inner end by an opening-closing dynamic ring seal against a housing located in the lower front part of the lower part of the valve cap.

Logically, the internal diameters of the three parts of the valve cap are carried out with a dimension which is greater than the dimension of the valve shaft diameter.

The dynamic ring seal at the inner end of the valve shaft, which opens or closes over the front of the lower part of the valve cap, is mounted on a small neck provided in the proximity of the free end of the valve shaft, with this neck being provided with two stepped areas or portions of different diameters.

In the upper stepped area with a larger diameter, an approximately trunco-conical metallic bushing is situated, whose smaller base is supported on the edge which is formed, above, by the valve shaft itself. The dynamic ring seal is supported on the larger lower base of the bushing, with the diameter of the dynamic ring seal being larger than the dimension of the diameter of the larger base of the bushing.

On the lower portion of the neck, in the stepped area with the smaller diameter, a washer is placed. The dynamic ring seal remains axially controlled, therefore, between the bushing and the washer. The free lower end of the valve shaft is riveted onto the washer itself.

This washer has a slightly smaller diameter than the diameter of the lower part of the valve cap so that the washer does not make contact with the inner surface of the inner cylindrical tube body where the washer is housed.

The dynamic ring seal is received in a ring-shaped slot or housing cut in the front of the lower part of the valve cap, with this housing being trunco-conical in shape. The bushing is received in the interior of the hole in the lower part of the valve cap.

In normal conditions of the cylinder, the valve shaft occupies a perfectly longitudinal position in accordance with the axial axis of the said cylinder. As there is no external action on the valve shaft from the exterior, the pressure of the gas in the internal chamber acts against the washer, which cuts off the passage of the gas with its dynamic ring seal.

When there is any operation on the outer end of the valve shaft, the washer tilts and the seal opens the duct or space, with which the movement of the cylinder shaft takes place. The degree of the tilt capable of activating the cylinder can be very small because a length of an arm of a lever to a position of the seal and washer is considerable.

When this tilting takes place, the washer is inclined and becomes partially supported on the outer front of the inner part of the valve cap, the same as the dynamic ring seal in its contact with the trunco-conical slot or housing in the lower part.

The gas is transferred then from the upper internal chamber of the cylinder to the passage, duct or space created, and through the space between the valve shaft and the valve itself, moving into the intermediate chamber between the tube bodies and from there to the lower internal chamber of the gas-filled cylinder.

In this movement, the trunco-conical metallic bushing arranged on the dynamic ring seal does not obstruct the passage of the gas, because the diameter of its larger end, which is the lower one, is smaller than that of the dynamic ring seal.

To facilitate the assembly of the cylinder with regard to the item to be adjusted, for example a chair, the assistance of an auxiliary element by way of a cylindrical boss is used, and receives the end of the cylinder that includes an outer end of the valve shaft.

Inserted into this boss is a transversal plate provided with limiting transversal play through corresponding windows cut in the side surface of the boss, close to one of its ends.

The transversal plate is provided with a centered hole in which the outer end of the valve shaft is inserted when housing the gas-filled cylinder in the interior of the boss with a certain adjustment.

With this arrangement, the operator who assembles the unit in the item to be adjusted (e.g. chair) only has to connect one of the projections from the plate to the applicable operating device. Thus, the assembly operation becomes considerably simplified, regarding both the assembly time and the ease with which the assembly is carried out.

BRIEF DESCRIPTION OF THE DRAWINGS

All these and other details of the invention can be observed in greater detail by referring to the accompanying sheets of drawings, where the following are represented:

FIG. 1 is an elevation of a gas-filled cylinder in accordance with the invention, in its rest position.

FIG. 2 corresponds to the cylinder shown in FIG. 1, with the valve shaft operated.

FIGS. 3 and 4 represent the upper portion of the cylinder shown in FIG. 1, enlarged for better understanding.

FIG. 5 represents a breakdown of the valve shaft, with the bushing, the dynamic ring seal and the washer.

FIG. 6 shows the assembly of the components in FIG. 5.

FIG. 7 is an enlarged view, in exploded form, of the interrelationship between the valve shaft and the set of component parts adjacent to or connected to the valve shaft.

FIG. 8 shows the assembly of the components in FIG. 7.

FIGS. 9, 10 and 11 represent the assembly bushing for the gas-filled cylinder in an elevation view, a side view of the elevation and a perspective view of the receiver plate that receives the outer end of the valve shaft.

DETAILED DESCRIPTION OF THE PREFERRED EMBODIMENTS

FIGS. 1 and 3 show a gas-filled cylinder, formed by an outer tube (1) and an inner tube (2) separated by an intermediate gas passage chamber (3). Both tubes (1 and 2) are separated by the valve cap (7, 8, 9) and shaft cap (6) both of which enable the gas to pass between the internal chambers (4, 5) separated by the piston (18) connected to the cylinder shaft (16). In this position, the cylinder is at rest as the gas passage (15) of the valve cap (7, 8, 9) is closed by the dynamic ring seal (11) pressed by the washer (12) against the housing (24) in the lower part (9) of the valve cap. This position is permanent while the outer end (14) of the valve shaft (13) is not operated.

The valve shaft (13) passes comfortably through the cavity provided by the parts (7, 8, 9) of the valve cap and is clasped in the interior of the valve cap by the inner ring seal (19), which adapts to the valve shaft and prevents the passage of gas upwards at all times.

The valve shaft (13) is finished off at its inner end by the bushing (10), the dynamic ring seal (11) and the washer (12). The bushing (10) is housed in the cylindrical cavity in the lower part (9) of the valve cap, the dynamic ring seal (11) in the housing (24) of the lower part (9) and the washer (12) is supported on the outer front of the lower part (9).

If, as shown in FIGS. 2 and 4, the outer end (14) of the valve shaft (13) is moved from the exterior, the arm of the lever that extends from this outer end (14) to the washer (12) with minimum displacement makes the washer (12), the dynamic ring seal (11) and the bushing (10) tilt. This tilt leaves a space (17) between the dynamic ring seal (11) and the housing (24) which allows the gas to pass from the internal chamber (4) to the gas passage (15) and from there to the intermediate gas chamber (3) all the way to the shaft cap (6) and through the shaft cap (6) into the internal chamber (5). The gas transfer moves the piston (18) which moves and the attached cylinder shaft (16).

To do this, the bushing (10) is provided with a specific shape that allows the gas to pass upwards when the dynamic ring seal (11) has separated partially from its total contact with the housing (24). As the gas can not go past the inner ring seal (19) of the valve cap (7, 8, 9), it goes unfailingly towards the gas passage (15).

FIG. 5 shows that the inner end of the valve shaft (13) is configured with two stepped areas (20, 21) and an edge (22). The bushing (10) and the seal (11) are established on the first stepped area (20), whereas the washer (12) is established on the second stepped area (21).

FIG. 6 shows how the position of the bushing is limited by the edge (22) and the dynamic ring seal (11). The trunco-conical shape of the bushing (10) is such that its larger lower side is of a smaller diameter than the outer diameter of the dynamic ring seal, with the dynamic ring seal (11) protruding from the bushing (10), as can be appreciated.

The free end (23) of the second stepped area (21) of the shaft (13) is riveted so that the dynamic ring seal (11) becomes perfectly controlled between the bushing (10) and the washer (12).

In FIG. 7 we can observe the breakdown of the valve shaft (13) and adjacent components, the upper part (7), the middle part (8), the seal (29) between the upper part (7) and the middle part (8), which also adjusts to the interior of the outer tube (1), the inner ring seal (19) that clasps the shaft valve (13) and the lower part (9) that includes the gas passage (15).

Below the lower part (9), the seal (25) is supported on the interior on the inner tube (2), the valve shaft (13), the bushing (10), the dynamic ring seal (11) and the washer (12).

The assembly of these components is illustrated in FIG. 8, showing the assembly with the valve shaft (13) in the rest position.

Once the cylinder has been configured as described, its assembly is facilitated in accordance with FIGS. 9, 10 and 11.

In order to do this, the end of the cylinder from which the outer end (14) of the valve shaft (13) projects is housed in the boss (30) provided with the lid (30'), with a certain amount of adjustment, until the end of the cylinder reaches the plate (25) arranged transversally and provided with a hole (26), and the hole (26) receives the outer end (14). It can be appreciated that this plate (25) moves in the interior of the boss (30) and can protrude from the outer side surface in order to facilitate its prior positioning so that the hole occupies a centered position.

Therefore, it is sufficient to insert the cylinder so that the outer end (14) is housed in the hole (26) in the plate (25).

Once this insertion has been carried out, the operator responsible for assembling the element to be adjusted simply has to fix the means of connection to the plate (25) so that the cylinder operates.

The plate (25) is provided with means of any kind that limit its transversal movements in the grooves (27) and prevent the plate (25) from coming out, for example, some appropriately spaced ridges (28) that allow the transversal play, as shown in FIG. 11.

What is claimed is:

1. Gas-filled cylinder including an outer tube, an inner tube, an intermediate gas passage chamber between the tubes, a valve shaft, a valve cap, a shaft cap, a cylinder shaft with a piston dividing the inter tube into two internal chambers where an outer end of the valve shaft protrudes to an exterior of the cylinder so that the cylinder can be operated from the exterior, and an inner end of the valve shaft passes through a cavity of the valve cap and; is connected to a dynamic ring seal and a washer, where the cylinder, where operated, allows the gas to pass from one internal chamber to the other internal chamber through the intermediate gas passage chamber and through the valve cap and the shaft cap, said gas-filled cylinder comprising the valve cap including an upper part, a middle part and a lower part, and an inner diameter of the cavity is greater than a diameter of the valve shaft, and the parts house an inner ring seal that adjusts the valve shaft, and when the cylinder is at rest, the valve shaft avoids contact with the valve cap, the washer makes complete contact with a front of the lower part of the valve cap, and the dynamic ring seal is housed in a trunco-conical housing in the lower part, whereas when the cylinder is operated, the washer separates at least partially from the front of the lower part of the valve cap, and the dynamic ring seal separates at least partially from the trunco-conical housing of the lower part, creating a gas passage.

2. Gas-filled cylinder, in accordance with claim 1, wherein on an end of the cylinder, from which the upper end of the valve shaft protrudes, is housed in an interior of a boss, in which a transversal plate provided with a hole is situated, where the outer end of the valve shaft is inserted in the hole, and where the plate protrudes towards an exterior of the boss, lateral movement is provided with open grooves cut in a side surface of the boss.

* * * * *